US007459643B2

(12) United States Patent
de la Borbolla

(10) Patent No.: US 7,459,643 B2
(45) Date of Patent: Dec. 2, 2008

(54) QUICK INSERT CLAMP FOR METAL BOXES

(75) Inventor: Ian Rubin de la Borbolla, Memphis, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 11/726,732

(22) Filed: Mar. 22, 2007

(65) Prior Publication Data

US 2008/0230267 A1 Sep. 25, 2008

(51) Int. Cl.
*H02G 3/18* (2006.01)

(52) U.S. Cl. ........................ 174/655; 174/50; 174/653; 174/659; 16/2.1; 248/56; 439/98

(58) Field of Classification Search .................. 174/50, 174/58, 60, 63, 64, 655, 653, 659; 439/142, 439/552, 557, 98; 16/2.1; 248/56; 285/194, 285/921

See application file for complete search history.

(56) References Cited

U.S. PATENT DOCUMENTS

| | | | | | |
|---|---|---|---|---|---|
| 1,383,879 | A * | 7/1921 | Thomas, Jr. | | 220/3.2 |
| 1,760,663 | A | 5/1930 | Rosenfield | | |
| 1,772,241 | A | 8/1930 | Calderwood | | |
| 1,802,979 | A * | 4/1931 | Madden et al. | | 285/154.3 |
| 1,822,128 | A | 9/1931 | Clayton | | |
| 1,914,635 | A | 6/1933 | Goetzelman | | |
| 2,000,851 | A * | 5/1935 | Knell | | 220/3.2 |
| 2,458,409 | A | 1/1949 | Paige | | |
| 2,564,341 | A | 8/1951 | Paige | | |
| 2,590,004 | A * | 3/1952 | Givens et al. | | 285/154.3 |
| 2,706,647 | A | 4/1955 | Gillespie | | |
| 3,814,467 | A | 6/1974 | Van Buren, Jr. | | |
| 3,858,151 | A | 12/1974 | Paskert | | |
| 4,012,578 | A | 3/1977 | Moran et al. | | |
| 4,032,178 | A | 6/1977 | Neuroth | | |
| 4,885,429 | A | 12/1989 | Schnittker | | |
| 4,990,721 | A | 2/1991 | Sheehan | | |
| 5,013,872 | A | 5/1991 | Lockwood et al. | | |
| 5,204,499 | A | 4/1993 | Favalora | | |
| 5,373,106 | A | 12/1994 | O'Neil et al. | | |
| 5,932,844 | A | 8/1999 | MacAller et al. | | |
| 6,043,432 | A | 3/2000 | Gretz | | |
| 6,064,009 | A | 5/2000 | Jorgensen et al. | | |
| 6,080,933 | A | 6/2000 | Gretz | | |
| 6,194,661 | B1 | 2/2001 | Gretz | | |
| 6,290,375 | B1 * | 9/2001 | LeVasseur | | 362/368 |
| 6,335,488 | B1 | 1/2002 | Gretz | | |
| 6,352,439 | B1 | 3/2002 | Stark et al. | | |
| 6,355,884 | B1 | 3/2002 | Gretz | | |
| 6,521,831 | B1 | 2/2003 | Gretz | | |

* cited by examiner

*Primary Examiner*—Dhiru R Patel
(74) *Attorney, Agent, or Firm*—Hoffman & Baron, LLP

(57) ABSTRACT

A dual-clamp device attaches a pair of metal clad cables to a junction box. The clamp device is integrally formed defining a pair of side-by-side cable receiving members separated by a central web. Each cable receiving member is generally in the form of an elongate split cylinder permitting radial resilient movement. Forward fingers on each cable insertion end of the cable receiving member provides for engagement with the wall in the junction box upon insertion. The cable receiving member supports the wall of the junction box between the forward fingers and a spring tab on the central web.

10 Claims, 2 Drawing Sheets

QUICK INSERT CLAMP FOR METAL BOXES

FIELD OF THE INVENTION

The present invention relates to a device used to secure metal clad (MC) armored cable to a box or a wall. More particularly, the present invention relates to a dual integrally formed clamp which facilitates easy installation of armored cable(s) to the box.

BACKGROUND OF THE INVENTION

There are currently two methods for attaching MC armored cable into box openings. One employs existing internal/external clamps and added secondary connectors/fittings. The internal clamps usually are attached to the box by means of a threaded screw. This serves to keep the connector in place, and to compress the connector onto the cable once inserted. This is, however, a manual process, and can be difficult to thoroughly tighten down to the necessary torque. If the clamp is on the inside, knockout holes must be removed before cable insertion. Also, the protruding screw on the backside of the box might become a concern for the end user at times.

A second method is to attach a connector to the existing box. This is typically done on the outside. In most cases, this involves removing existing box knockout holes, inserting the connector, and finally inserting the cable into the connector body. Usually the inside body of the connector has teeth or fingers to grab and hold the cable in place. Removal of these systems is very difficult, due in part to the nature of the design. Most of these systems have two separate functions, the front of the connector latches to the body of the box, and independently, the teeth on the rear (usually located inside the fitting) hold the cable in place. The front latching mechanisms are typical of multi-finger designs that make it difficult to remove the connector without destroying the fingers.

For other designs, once the cable is inserted, an interference fit is created, by means of the teeth flexing towards the outer housing of the assembly. The walls of the connector wedge the outer walls of the box, internally by the cable, and externally by the box. These connectors can be removed by removing the interference, i.e., the cable body itself, from the connector. These connectors can be difficult to install while the cable is in the fitting, due to the fact that the fitting is already flared out and now must be compressed into place into the box.

Other connectors for attaching cable to a box are known. U.S. Pat. No. 2,458,409 and U.S. Pat. No. 3,858,151 and U.S. Pat. No. 4,012,578 all disclose a single piece cable connector. However, each connector must be inserted from inside the box.

U.S. Pat. No. 4,990,721 shows a one-piece connector that is inserted from outside the box. U.S. Pat. No. 6,194,661, U.S. Pat. No. 6,355,884 and U.S. Pat. No. 6,521,831 each show a duplex connector, i.e. two connectors alongside each other.

SUMMARY OF THE INVENTION

The present invention provides a dual-clamp device for attaching a pair of metal clad cables to a junction box. The junction box has a pair of side-by-side knockout openings in the wall thereof to permit access to the interior of the box. The clamp device includes an integrally formed clamp body defining a pair of side-by-side cable receiving members separated by a central web. Each cable receiving member is generally in the form of an elongate split cylinder permitting resilient radial movement. Each cable receiving member includes a cable insertion end insertable into the knockout opening of the box and a cable receiving end insertably accommodating the cable. Forward fingers adjacent each of the cable insertion ends provide for engagement with the wall of the box. The cable receiving members support the wall of the junction box between the forward fingers and the web.

In a preferred embodiment, the forward fingers are struck outwardly from the clamping body.

Each cable receiving member is radially compressible to allow insertion of the cable insertion end into the knockout opening. Each cable receiving member is also radially expandable to permit insertion of the cable into the cable receiving end.

DETAILED DESCRIPTION OF PREFERRED EMBODIMENTS

Figure 1:
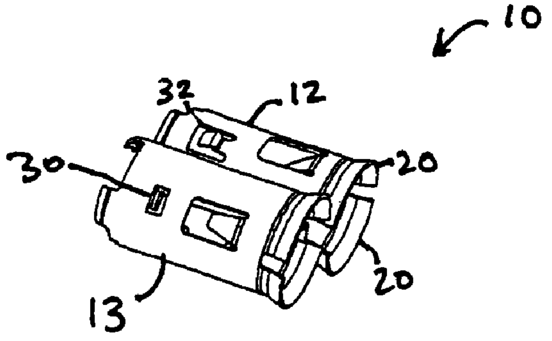
FIG. 1 is a side perspective views of a preferred embodiment of a pair of the clamps of the present invention.
Figure 2:
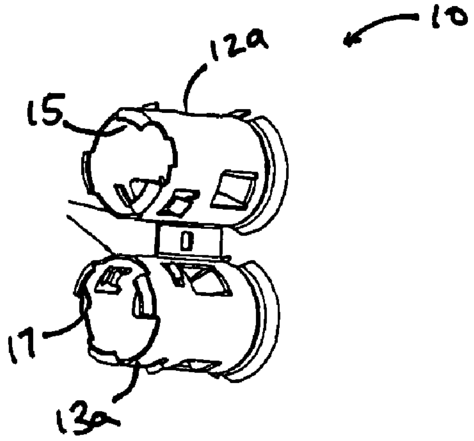
FIG. 2 is a front perspective views of the preferred embodiment as shown in FIG. 1.
Figure 3:
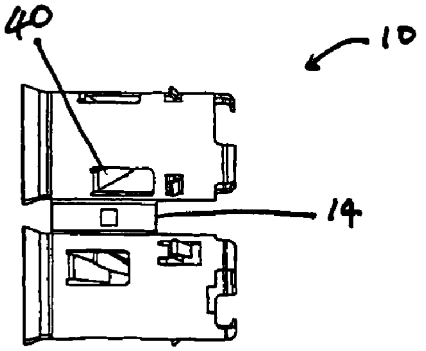
FIG. 3 is a top plan view of the preferred embodiment as shown in FIG. 1.
Figure 5:
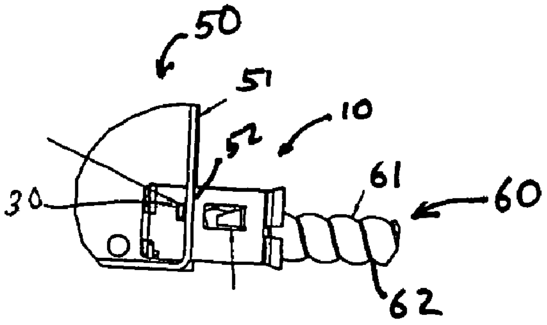
FIG. 5 is a side plan view of the preferred embodiment as shown in FIG. 1 shown partially disposed inside a knockout hole of a junction box.

An improved dual-clamp device 10 constructed in accordance with the present invention is illustrated in FIGS. 1 and 2. The dual-clamp device 10 can be inserted through a pair of side-by-side openings 52 in a wall 51 of a junction box 50 as illustrated in FIG. 5. Although this device can be snapped-in to a junction box to secure a pair of MC armored cables to the box (and thus be considered a clamp), it can also be a stand-alone fitting as well.

Figure 4:
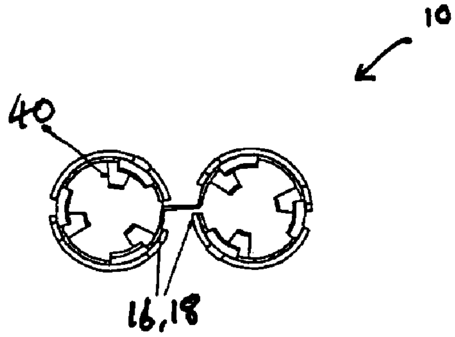
FIG. 4 is a front plan view of the preferred embodiment as shown in FIG. 1.
Figure 6:
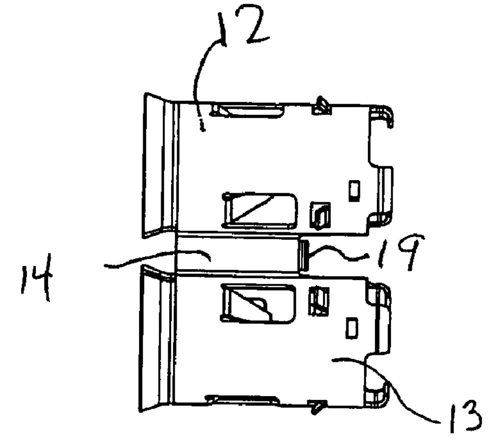
FIGS. 6 and 7 shows side and front plan views respectively of a further preferred embodiment of the present invention.
Figure 7:
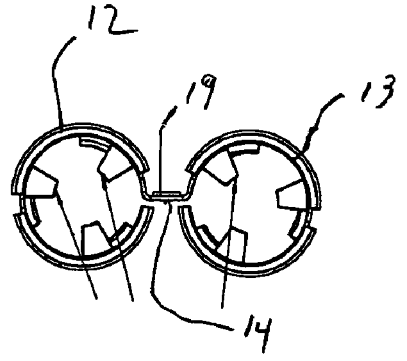

As shown, clamp device 10 includes two clamps 12 and 13, side-by-side that are connected by an intermediate web 14 optionally configured with a pre-load spring tab 19 shown in FIGS. 6 and 7. As shown in FIG. 4, neither clamp defines a full circle. Instead, there is a longitudinal cut or split 16, 18 along each clamp. As can be appreciated, the dual-clamp device can be made from a flat continuous sheet of metal or any other rigid material that is then stamped before it is rolled at both ends into either an “S” or a “3” shape configuration. This configuration enables the clamp device 10 to be radially resiliently movable as well as flexible so as to contract when inserted into a knock-out opening 52 in a junction box 50. As shall be discussed in detail below, once snapped in, the spring tab 19 of the web 14 in connection with the teeth 30, 32 on the tubular body, firmly grasp the wall 51 of the junction box 50. The spring tab 19 of the intermediate web 14 creates an interference when the dual-clamp device 10 is assembled with the box 50 so it can not be inserted all the way into the box. Thus, the spring tab 19 of the web 14 functions as a stop and prevents the dual-clamp device 10 from being inserted too far within the box 50. It can be seen that the dual-clamp device 10 is utilized to connect a pair of electrical MC armored cables 60 each having a helical groove 61 formed in its outer covering with a junction box.

As seen in FIG. 2, each clamp 12, 13 includes a generally cylindrical tubular body 12*a*, 13*a* which receives the MC armored cable 60 at its front end. In the front end, a set of arc-shaped flanges 15 extend radially inwardly toward the space for the MC armored cable 60. In addition, the flanges 15 extend toward the center (see FIG. 5) to catch the metal clad portion 61 of the MC armored cable 60. An annular outer rim 17 of the flange has a curved surface which additionally prevents damage to the wires if they are pressed against the flange 15.

Figure 8:
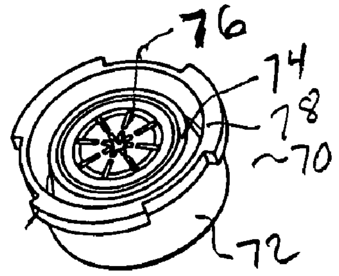
FIG. 8 is perspetive showing of a end cap employed in combination with the dual clamp devise of the present invention.
Figure 9:
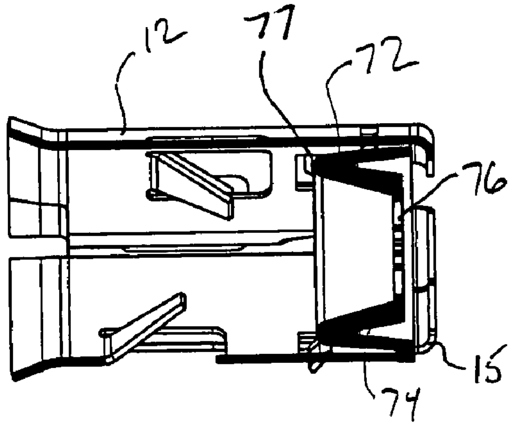
FIGS. 9 and 10 show respectively a longitutal cross sectional view and end view of the dual clamp device of the present invention including the inserted end cap of FIG. 8.
Figure 10:
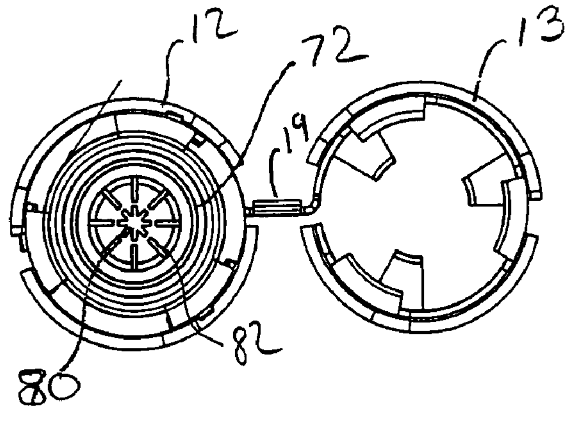

As particularly shown in FIGS. 8 through 10 the present inversion may optionally employ an end cap 70 is formed of a plastic material which is flexible and resilient. The end cap 70 includes a generally cylindrical body 72 and an upstanding central portion 74 having a flat planar portion 76. The area between the cylindrical body 72 and the upstanding portion 74 forms generally a flexible spring which allows the end cap 70 to be inserted into the front portion of the clamps 12 and 13. The cylindrical body 72 includes a rim 78 having cut out portion 79 therein. The cut out portions are aligned with the flanges 15 so as to permit insertion of the end cap into the clamp. A stop 77 holds the end cap 70 in place. The planar portion 76 of end cap 70 is rupturable by insertion of the conductors (not shown) of the armored cable 60 thereinto. In that regard, the planar portion 76 includes a generally star shaped opening 80 which facilitates entry of the conductors therethrough. Extending in radial fashion about the star shaped opening 80 are a pluarlity of partially formed slits 82 which facilitate rupturing of the planar portion 76 upon insertion of the conductors of table 60 therethrough. The end cap may be used to seal the clamps 12 and 13. Moreover, in situations where only one clamp is being used, the end cap 70 provides for closure of the unused clamp.

As shown in FIG. 1, the rear portion of the clamps 12, 13 provides for cable receiving and includes a tapered lead in 20. The lead-in 20 guides the cable to allow easier insertion of MC armored cables into the clamps and prevents contact of the MC armored cables with burrs or other sharp edges.

The front portion of the dual-clamp device 10 has fingers or teeth 30, 32 to catch onto the inside wall of the box when assembled. The teeth 30, 32 are lanced outwardly from the body of the clamps 12, 13. The teeth prevent the dual-clamp device 10 from being pulled out of the box 50 unless a sufficient force is applied such as when the user pries it out with a secondary tool such as a screwdriver or an equivalent. As seen, the teeth 30, 32 can be formed integrally from cutouts on the tubular bodies 12*a* 13*a*.

As the dual-clamp device 10 is inserted into the pair of circular openings 52, each tubular body radially contracts to allow entry. Further movement of the dual-clamp device 10 into the junction box moves the teeth 30 and 32 past the wall 51 and into engagement with inner surface thereon. The resilient radial movement of clamps 12, 13 is provided by the split cylindrical configuration of the tubular bodies 12*a*, 12*b*.

When the teeth 30 and 32 have been passed through the wall 51 of the junction box and engaged the inside thereof, the spring tab 19 of intermediate web 14 comes into contact with the outer surface of the wall 51. This is shown in FIG. 5. The teeth 30, 32 and the spring tab 19 of intermediate web 14 provide a firm connection between the dual-clamp device and the junction box.

Thus, the dual-clamp device 10 is held against movement relative to the wall 51 of the junction box 50 by the cooperation between a set of outwardly projecting teeth 30 and 32 and the spring tab 19 of intermediate web 14 which engage opposite sides of the wall 51. To hold the dual-clamp device 10 in the junction box, the spring tab 19 of intermediate web 14 engages the outer surface of the junction box while teeth 30 and 32 engage the inner surface of the junction box.

The rear section of each clamp is provided with inwardly projecting fingers or tabs 40 formed integrally with the clamps 12, 13. The fingers are lanced towards the center of the body of clamps 12, 13 similar to the teeth 30, 32. The tabs 40 project inwardly from the tubular wall of the dual-clamp device 10 to catch any MC armored cable received. Although three tabs 40 are included for each clamp in the embodiment shown, there may be other variations in numbers and placement. The tabs 40 are offset from each other to accommodate the pitch of the cable.

The tubular bodies 12*a* and 12*b* of the dual-clamp device 10 is designed to radially expand. This is accomplished by the fact that each side of the clamp has the cut 16, 18 mentioned above, that is positioned down the entire length of the dual-clamp device 10 in a direction that is parallel to the inserting cable 60. This allows for a flexing of the body radially outwardly to accommodate cable insertion. This movement may be limited towards the front of the dual-clamp cable 10 due to the fact that the wall of the body of the box 50 and the front of the cut section 16, 18 of the device are becoming an interference fit as the cable 60 is inserted.

The distal ends of the tabs 40 provide a pre-load to the groove 61 as the MC armored cable 60 is pushed into the dual-clamp device 10. For instance, when the MC armored cable is inserted into the clamp, the tabs 40 are disposed in a spatial arrangement such that at least one tab 40 may be in threaded engagement and may "dig" in between helical grooves 61 formed in a flexible electrical MC armored cable 60 to prevent the MC armored cable 60 from being pulled out of the dual-clamp device and to provide a solid connection between the dual-clamp device 10 and the MC armored cable.

The tabs 40 can be formed with a particular length such that its inner end portions can be disposed correspondingly with the same pitch as the helix of the groove 61. In addition, tabs 40 are cut with their inner-edge portions sloping at the same angle relative to a central axis of the dual-clamp device 10 as in which the turns of the helical groove 61 slope relative to the longitudinal axis of the MC armored cable 60. Thus, the inner surfaces of the tabs 40 form a portion of a helix of substantially the same pitch and diameter as the pitch and diameter of the helical groove 61 in the exterior wall 62 of the MC armored cable 60.

The tubular wall of the dual-clamp device 10 can be constructed so that it has an outside diameter which is just slightly smaller than the inside diameter of the opening 52 in the wall 51. Therefore, when the MC armored cable is inserted, it pushes out the teeth 30 and 32 to provide a tighter grip. On the other hand, if the MC armored cable is inserted first, before the device is inserted into the box, the outer diameter of the tubular wall 10 can be constructed so that it is slightly larger than the inside diameter of the opening 52. In this case, the flexible tubular wall is resiliently flexed inwardly to press the tabs 40 against the bottom of the groove 62 as the dual-clamp device is shoved into the hole 52 in the wall 51. The tabs 40 dig into the MC armored cable 60 to provide a firm electrical connection between the dual-clamp device and the MC armored cable when the cable is inserted. Since the tabs 40 are disposed in tight engagement with the groove 61 in the MC armored cable 60, a relatively large force is required in order to pull the MC armored cable out of the dual-clamp device.

The dual-clamp device 10 is designed to be easily snapped into the box 50. This quick insert approach allows for easy installation as well as easier removal of the cable or the entire connector if desired and permit an installer to readily and quickly attach armored cable to the box. The purpose of this design is to allow the user, without the need for accessory tools, to assemble an MC armored cable into a metallic box (single/multi gang box) via the quick insert dual-clamp device 10. This is achieved by pushing in the prepared cable into the desired opening of the box, where the cable will secure itself against the insert clamp during the insertion of the cable. This insertion dual-clamp device may be pre-attached to the outsides of the box, and will meet all listed safety electrical requirements.

The present invention also contemplates the dual-clamp device 10 being pre-assembled with the box at the time of manufacturing. Preferably, the dual-clamp device 10 may be supplied already attached or assembled to the box, instead of being provided as a stand-alone component that will be added in the field. Usually, existing clamps are either added-on as a secondary step by the user, wherein a manual secondary step must be performed to fasten the cable securely to the box opening. The invention takes the approach of being an actual part of the box itself, instead of existing as a secondary operation or not requiring any other assembly step other than pushing the cable into the already assembled clamp. Thus, there is no need for the installer to carry separate components nor does the installer have to pry out knock-outs. It allows the user to simply insert the prepared cable into the desired location without any secondary operations. There is no need to tighten down any screws, or insert any connectors.

Although the dual-clamp device 10 has been illustrated herein in association with MC armored cable 60 having only a single helical groove 61 in its outer surface, it is contemplated that a dual-clamp device constructed in accordance with the present invention could be utilized in association with a MC armored cable having a plurality of helical grooves formed in its outer surface. Of course, the inwardly projecting tabs 40 would be spaced so as to engage the helical grooves as the dual-clamp device was turned onto the end of the MC armored cable. It should also be noted that although the flange shields the wires from the end of the MC armored cable 60, it is contemplated that under certain circumstances a plastic sleeve may be utilized in association with the end of the MC armored cable in a known manner to further shield the wires from the MC armored cable. In addition, it is contemplated that the dual-clamp device 10 could be used with MC armored cables other than MC armored cables for holding electrical wires.

Further, a single clamp could also be used with an outer flange or a similar part instead of the intermediate web between the two clamps. Although the embodiment of dual-clamp device 10 advantageously formed from a single piece of metal is described such that the teeth 30 and 32, intermediate web 14, and tabs 40 are integrally formed, a single clamp construction facilitating connecting the device with the end of a single MC armored cable 60 is also envisioned by this invention. In addition, as can be seen in the drawings, when the dual-clamp device 10 is being formed, stress relief openings are advantageously formed at various parts such as on the intermediate web 14.

Various changes to the foregoing described and shown structures will now be evident to those skilled in the art. Accordingly, the particularly disclosed preferred embodiments are intended in an illustrative and not in a limiting sense. The scope of the invention is set forth in the following claims.

What is claimed is:

1. A dual clamp device for attaching a pair of metal-clad cables to a junction box having a pair of side-by-side knock-out openings in the wall thereof, said clamp device comprising: an integrally formed clamping body defining a pair of side-by-side cable clamping members separated by a central web; wherein said central web includes a spring tab for applying a pre-load against said wall of said junction box, each cable clamping member being generally in the form of an elongate split cylinder permitting resilient radial movement; each cable clamping member having a cable insertion end insertable into the knockout out opening in the box and a cable receiving end for insertable accommodating said cable; and forward fingers adjacent each said cable insertion end of said cable clamping member for engagement with the wall of the junction box, said cable clamping member supporting said wall of the junction box between said forward fingers and said web.

2. A dual clamp device of claim 1, wherein said forward fingers are struck outwardly from said clamping body.

3. A dual clamp device of claim 2, wherein each of said cable clamping member is radially resiliently compressible to allow insertion of said cable insertion end into the knock-out openings.

4. A dual clamp device of claim 3, wherein each said cable clamping member is radially resiliently expandable upon insertion of the cable into said cable receiving end.

5. A dual clamp device of claim 4, wherein each said cable receiving end includes a tapered lead-in to facilitate entry of the cable thereinto.

6. A dual clamp device of claim 5, wherein each said cable clamping member includes inwardly struck fingers adjacent said cable receiving end, for engagement with the cable upon insertion therein.

7. A dual-clamp device of claim 1 further including an end cap insertable into at least one of said cable clamping members.

8. An electrical junction box assembly for accomodating a pair of metal clad cables comprising: a junction box having a wall and a pair of side-by-side openings therethrough; a one piece dual clamp supported by said junction box wall and extending into said openings for providing passage of said cables thereinto; said dual clamp further including a pair of generally cylindrical tubular clamps separated by a connecting web, wherein said connecting web includes a spring tab for applying a preload against said wall of said junction box, each said tubular clamp having an insertion portion at one end insertably positioned through said opening of said junction box and an opposed cable receiving portion; said tubular clamps each including outwardly extending fingers adjacent said insertion portion thereof for engagement with said wall of said junction box for positioning said junction box wall between said fingers and said connecting web; said tubular clamp having a longitudinal split therealong to permit resilient radial expansion so as to permit insertion of said cable receiving portion.

9. A junction box assembly of claim 8 further including an end cap insertable into at least one of said tubular clamp.

10. A junction box assembly of claim 9 wherein said end cap includes a rupturable cable passage portion.

* * * * *

UNITED STATES PATENT AND TRADEMARK OFFICE

CERTIFICATE OF CORRECTION

PATENT NO. : 7,459,643 B2
APPLICATION NO. : 11/726732
DATED : December 2, 2008
INVENTOR(S) : de la Borbolla It is certified that error appears in the above-identified patent and that said Letters Patent is hereby corrected as shown below:

Title Pg, Item "(74) Attorney, Agent, or Firm - Hoffman & Baron, LLP"; should read --(74) Attorney, Agent, or Firm - Hoffmann & Baron, LLP--.

At column 6, line 16, claim 1, the printed patent reads "...end for insertable accommodating said cable..."; the patent should read instead as --...end for insertably accommodating said cable...--.

At column 2, line 17, the printed patent reads "…a side perspective views of a…"; the patent should read instead as --…a side perspective view of a…--.

At column 2, line 19, the printed patent reads "...a front perspective views of a…"; the patent should read instead as --…a front perspective view of a…--.

At column 2, line 30, the printed patent reads "...showing of a end cap…"; the patent should read instead as --…showing of an end cap…--.

Signed and Sealed this

Twenty-fourth Day of March, 2009

JOHN DOLL
*Acting Director of the United States Patent and Trademark Office*